INVENTORS
HAROLD SANFORD HILL
JAMES T. COGHILL
BY Geo B Rawlings.
ATTORNEY

Patented Nov. 6, 1951

2,573,709

UNITED STATES PATENT OFFICE 2,573,709

APPARATUS FOR RAPID HEAT TRANSFER IN PROCESS MATERIAL

Harold Sanford Hill, Kenogami, Quebec, Canada, and James T. Coghill, Rochester, N. Y., assignors to Price Brothers & Company, Limited, Quebec, Quebec, Canada, a corporation of the Province of Quebec Application July 8, 1946, Serial No. 681,917

3 Claims. (Cl. 257—73)

The present invention relates to transferring heat to or from a material in process.

A particular object of our invention is to provide apparatus for controlled rapid heating or cooling of material in process, which may be employed even in the case of difficultly agitatable substances and mixtures.

Another object is to provide apparatus for processing material in which sensitive control of the temperature of material in process may be achieved.

Other objects and advantages of the invention will be apparent from the following description, the accompanying drawings and the appended claims.

In brief, the apparatus of our invention comprises a machine having two opposed working surfaces between which a relatively thin layer of the process material may be engaged, means for imparting to the surfaces relative tangential motion of a gyratory character while maintaining their tractive contact with the material, and means for providing and maintaining a temperature gradient through at least one of the working surfaces while it is in contact with the gyrationally agitated material.

In the accompanying drawing wherein we have illustrated a preferred apparatus for the practice of our invention:

Figure 1:
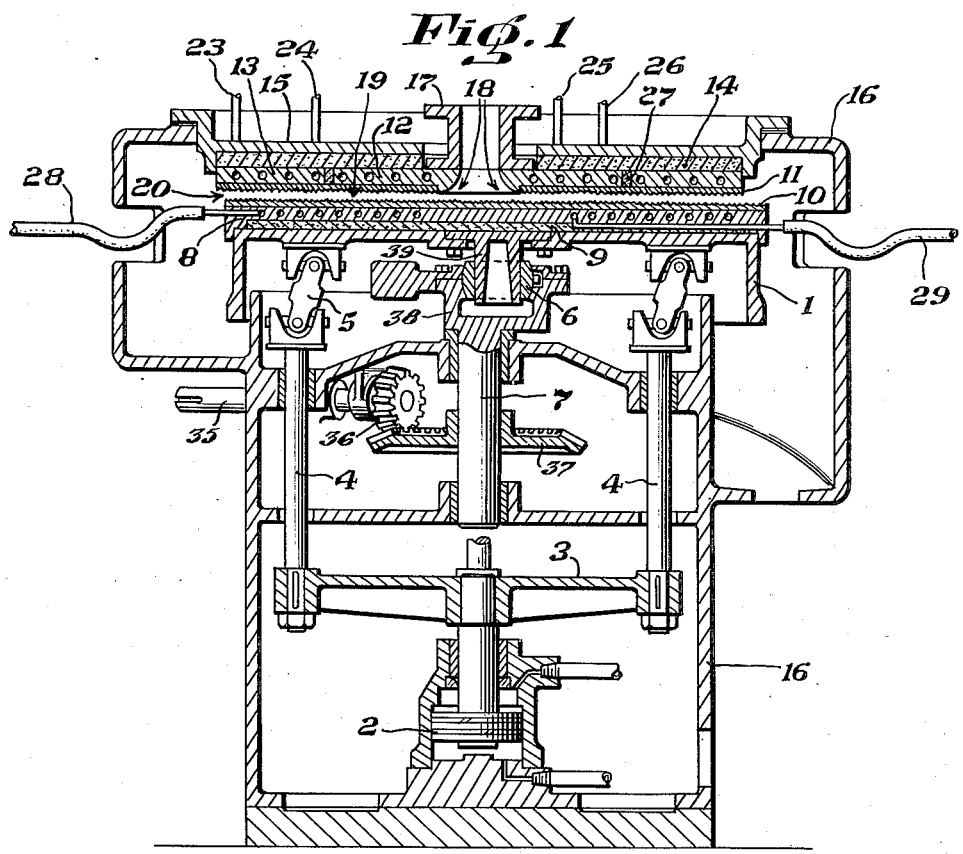
Figure 1 is a view in vertical section of an embodiment of the novel heat transfer apparatus of our invention.

Many classes of materials are difficult to agitate rapidly and thoroughly. Such classes include fibrous materials, pastes, emulsions, powdered and granular material, slurries, viscous liquids, etc. In general the rate at which such materials may be heated or cooled by contact means has been largely limited by the rate at which thorough agitation could be achieved.

We have now found that the extremely intense, rapid, and thorough agitation which may be obtained by gyrationally agitating a relatively thin layer of material, provides an opportunity for hitherto unrealized rates of heating and cooling, and that this opportunity is taken advantage of in ideal fashion by transferring the heat through the tractive surfaces which are used to produce the gyrational agitation of the layer of material. It is thus possible to raise the temperature of the material at very rapid rates without danger of local overheating; similarly, heat may be extracted from process material at correspondingly rapid rates, as may be useful in the case of strongly exothermic process reactions, or where it is desired to check a reaction sharply by lowering the temperature rapidly. It will be apparent that our apparatus may be used to provide a very sensitive and exact control of temperature in process material, either to maintain a constant temperature or to follow pre-determined heating or cooling curves. The more positive and sensitive control of process temperature thus provided will result in benefits both as to quality of product and as to process efficiency. In general, it will be possible with our apparatus to carry out numerous processes at higher temperatures and consequently in much shorter times than has hitherto been practicable.

While it will be apparent that our apparatus has particular value in processing materials which are difficult otherwise to agitate rapidly and thoroughly, we do not mean to imply that the usefulness of our apparatus is restricted to this class of material. Our apparatus produces improved results and increased heat transfer efficiency also in the case of intermediate and easily agitatable materials. As will be shown, with our apparatus a material may readily be processed as a continuously flowing, perfectly agitated, thin layer and be heated or cooled at a very rapid rate or according to a closely controlled temperature curve, as desired.

The gyrational agitation referred to in the present disclosure and appended claims is of the same general character as that described in our pending applications Serial No. 674,671, filed June 6, 1946, now abandoned, and 674,672, filed June 6, 1946, to which reference is made for complete description. Briefly, it is the agitation which is produced in a material when a relatively thin layer of it is engaged between and in tractive contact with two opposed surfaces and the surfaces are then moved tangentially, in gyratory fashion, relative to one another. This sets up criss-crossing, ever-changing lines of force and action throughout every portion of the layer of material, which is thin enough so that the spheres of action induced by each of the surfaces meet or overlap in the center of the layer. For many materials this requirement is fulfilled in layer thicknesses in the range of one-sixty fourth to three-eighths of an inch. Not only is the agitation intense and complete throughout the layer of the material, but it is particularly vigorous at the contact zone between the working surfaces and the material, so that in effect each point on the working surface is under continual scrubbing action. This eliminates inactive surface layers in the case of solid materials and reduces them to a minimum in the case of liquids, and assists in preventing formation of incrustations on the heating surfaces, thereby providing the more important conditions for efficient heat transfer. Almost instantaneous heating without surface scorching is possible with our apparatus, even in materials which have heretofore been very difficult to agitate thoroughly, for example, wood pulp at high consistencies.

By the term "tractive contact" as used in the present disclosure and appended claims, we mean the condition where there is little or no slipping at the contact zone between the material and the engaging surfaces, even though there is rollwise traverse of the material over the surfaces in the case of fibrous and some classes of powdered and granular materials, and an induced dragging sort of traverse in the case of viscous liquids, pastes, etc. The main purpose and requirement of the tractive contact is that the engaging surfaces shall transmit their relative gyrational motion into the layer of material, and obviously this could not be satisfied if there were a slip or shear zone at the contact surfaces. Various factors combine to set up and maintain this necessary condition of tractive contact, including: a suitable type of roughness of the surface adapted to the kind of material being processed, the relative tangential velocity of the opposed surfaces, and the pressure which the surfaces exert on the layer of material. In general, high velocity and high pressure are not favorable conditions for maintaining tractive contact relative tangential velocities of the surfaces ranging from 100 to 350 feet per minute; and pressures from 5 to 20 pounds per square inch are effective for many materials, although we do not limit the use of our apparatus to any particular range of speed or pressure, or to any particular texture or pattern of the surfaces, so long as the specified condition of tractive contact is maintained. It is not difficult for one skilled in the art to select a combination of surface texture, velocity, and pressure suitable for a particular process material and application.

The condition of "relative tangential velocity of a gyratory character," which is specified for the working surfaces in the present disclosure and appended claims, is generally the same as that described in our above mentioned applications. A preferred embodiment is that where one of the surfaces is stationary and the other gyrates in a substantially parallel plane with reference to the first surface, in a manner such that all points of the gyrating surface describe circular paths of equal diameter. Suitable amplitudes of gyration for many applications of our apparatus are in the range of one-half to four inches, and suitable frequencies in the range of 50 to 2000 cycles per minute. It should be noted that the words gyration, gyrational, etc., are here used in the special sense generally given them in engineering parlance; e. g., as in gyratory screens, gyratory crushers, etc., where an element of eccentric motion is involved, rather than in the sense of mere rotation of a body about a single stationary axis of rotation.

It will be apparent that the temperature gradient previously referred to extends through the surface and its backing structure to a heating or cooling medium and, we use the expression "temperature gradient through the surface" in this ordinary sense common to all contact heaters or coolers. In cases where the process material is to be heated, the necessary temperature gradient may be provided by passing steam, hot water or other fluid heating medium, through cavities or coils in the backing structure supporting the surface. Or, it may conveniently be provided by passing an electric current through resistance heating elements integrated with the surface or its supporting structure. In cases of cooling the process material, the reverse temperature gradient is provided by passing cold water, brines, or other refrigerating media through cavities or coils in the surface or its backing structure. In some cases, owing to the great efficiency of our apparatus, we may provide only one of the opposed surfaces with a temperature gradient, although, of course, both surfaces will be used where maximum rates of heat transfer are required.

While the apparatus of our invention may be constructed in various ways we prefer for continuous operation to use a novel modification of the type of apparatus described in our pending application Serial No. 674,672, filed June 6, 1946, the modification consisting of provision of means for heating or cooling the working surfaces. This combination of the apparatus of the above designated pending application and means for controlled variation of the temperature of its working surfaces is one which is not only novel in itself but also provides a means for obtaining new and useful results greatly beyond the scope of the original apparatus.

In Figure 1 we show at 1 a circular gyrating element which is supported in a horizontal plane and prevented from rotating on its own axis, and controlled with respect to its vertical position by the piston 2 acting through the yoke 3, the columns 4 and the universal joints 5. The gyrating element 1 is driven from any suitable source of power through a shaft 35 which has a bevel pinion 36 secured to its inner end. This pinion meshes with a bevel gear 37 which is keyed or otherwise fastened to a shaft 7. The shaft 7 is suitably journaled in the frame of the machine and at its upper end is formed with a cup member 38. This cup member is counterbored eccentrically of the shaft 7 to receive a self-aligning bearing 6. Mounted within the bearing 6 is a pin 39 that is bolted to the element 1.

The eccentric cup 38 and pin 39 serve to impart circular motion to the element 1 but the universal joints 5 through their connection with the relatively stationary columns 4 serve to hold the element 1 against rotation. As a result, the element 1 has an orbital motion, and all points in its surface have the same velocity and describe non-concentric circles of equal diameter.

A heat transfer element 8 is mounted upon the gyrating element 1 and separated from it by insulating material 9. A gyrating working surface 10, here shown as a replaceable surface, is attached to the element 8. A stationary working surface 11 is located directly opposite the gyrating working surface 10, and defines therebetween a relatively thin working space 19. The stationary working surface 11 is supported through the heat transfer elements 12 and 13 and the insulating material 14 by the supporting element 15 which is connected to the frame 16 of the apparatus. The inlet 17 communicates with the feeding zone 18.

For continuous operation, the raw materials are supplied at the inlet 17 and enter into the working space or treating zone 19 through the feeding zone. Gyrational agitation of the materials is produced in the treating zone by the motion of the gyrating working surface 10 and by virtue of the tractive contact with the surfaces 10 and 11 with the material in the treating zone. At the exit zone 20 the treated material is discharged into a suitable trough for collection or into other collecting apparatus as may be required by the nature of the material.

Figure 2:
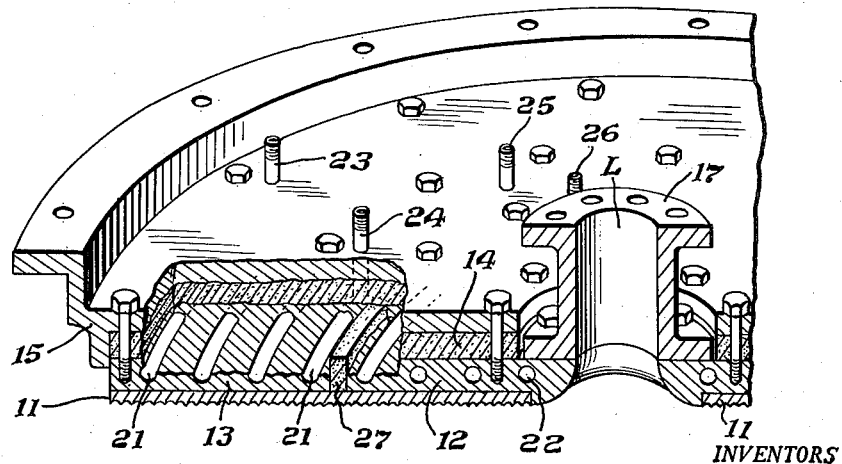
Figure 2 is a more detailed, partly sectioned, view of a portion of one working surface suitable for use in an apparatus such as is shown in Figure 1.

In Figure 2 wherein we have shown in greater detail the stationary element assembly of the machine of Fig. 1, the passages 21 in the heat exchange element 13 are connected through the pipes 23 and 24 to a source of supply of heat exchange media. Likewise the passages 22 in the element 12 are connected through pipes 25 and 26 to the same or another source of heat exchange media. As shown in Fig. 1 the pipe connections 28 and 29 convey heat exchange media to a similar heat exchange element associated with the gyrating treating surface.

In Fig. 2 we have shown two concentric heat exchange elements 12 and 13 separately controllable as to temperature, although more might be used, or a single one, as desired for specific applications. Using the construction of Fig. 2, steam may be supplied to passageway or coil 22 to initiate a reaction, facilitate blending of a viscous mixture, etc., while a refrigerant may simultaneously be supplied to the passageway or coil 21 to quench the reaction or for other purposes, the thermal barrier 27 preventing adverse interaction between the hot and cold elements. Alternatively, steam or other heating medium, or a cooling medium, could be supplied to both the passageways or coils 21 and 22 if desired. While the construction shown is suitable for use with vapor or liquid heating or cooling media, it will be apparent that the coils or passageways may be replaced by electrical resistance heaters imbedded or recessed in the elements 12 and 13, or such an electrical heater might be imbedded in one element such as 13 while the passageway or coils 21 in the other element provide for circulation of a cooling medium.

While we have shown and described a preferred embodiment of the apparatus of our invention, various modifications thereof may obviously be resorted to within the spirit and scope thereof as defined by the appended claims.

We claim:

1. In a machine for the continuous treatment of process material the combination comprising two coacting elements having their respective opposed working surfaces adapted and arranged to form therebetween a relatively thin working space, said working space having at one boundary an inlet zone providing entry for continuously fed material and at another boundary a discharge zone so positioned relative to the entry zone that the working space extends therebetween, means connected to said coacting elements for imparting to their working surfaces relative tangential motion of a gyratory character, and means for heating one selected area of at least one of said working surfaces whereby a heating zone is formed in the working space and means for cooling another selected area of at least one of said working surfaces whereby a cooling zone is formed in the working space.

2. In a machine of the character described, a pair of opposed working surfaces, one of the surfaces comprising a plurality of concentric rings insulated from one another, an inlet duct disposed centrally of one of the surfaces for supplying process material between said surfaces, a discharge zone at the periphery of the outermost rings, means for imparting a bodily gyratory movement to one of the surfaces about an axis coaxial with said rings to agitate the process material between the surfaces, and means for producing different temperatures in different rings thereby to apply different temperatures to the material as it moves from its point of entry between the surfaces to a point of discharge therefrom.

3. A processing machine comprising two opposed working surfaces which are roughened on their opposed faces to afford traction for the process material without obstructing traverse of the material over said surfaces, an inlet disposed centrally of one of said surfaces for entry of the material between the surfaces, a discharge zone at the periphery of one of said surfaces for discharge of the material from between them, means for imparting a relative translatory gyratory motion between said surfaces, means pressing one of said surfaces toward the other during said gyratory motion, the axis of said gyratory motion extending in the direction of pressure, means limiting the distance of approach of said one surface toward the other to maintain a working space between the working surfaces during said gyratory motion, and means providing a controlled temperature gradient through at least one of said surfaces during said gyratory motion.

HAROLD SANFORD HILL.
JAMES T. COGHILL.

REFERENCES CITED

The following references are of record in the file of this patent:

UNITED STATES PATENTS

| Number | Name | Date |
|---|---|---|
| 657,206 | Terrel et al. | Sept. 4, 1900 |
| 863,589 | Chavanne et al. | Aug. 20, 1907 |
| 1,057,427 | Highee | Apr. 1, 1913 |
| 1,163,246 | McCone | Dec. 7, 1915 |
| 1,571,599 | North | Feb. 2, 1926 |
| 2,121,275 | Zober et al. | June 21, 1938 |
| 2,211,518 | Scherbaum | Aug. 13, 1940 |
| 2,255,986 | Rapisarda | Sept. 16, 1941 |

FOREIGN PATENTS

| Number | Country | Date |
|---|---|---|
| 1,226 | Great Britain | May 15, 1863 |
| 223,988 | Germany | July 22, 1910 |